UNITED STATES PATENT OFFICE.

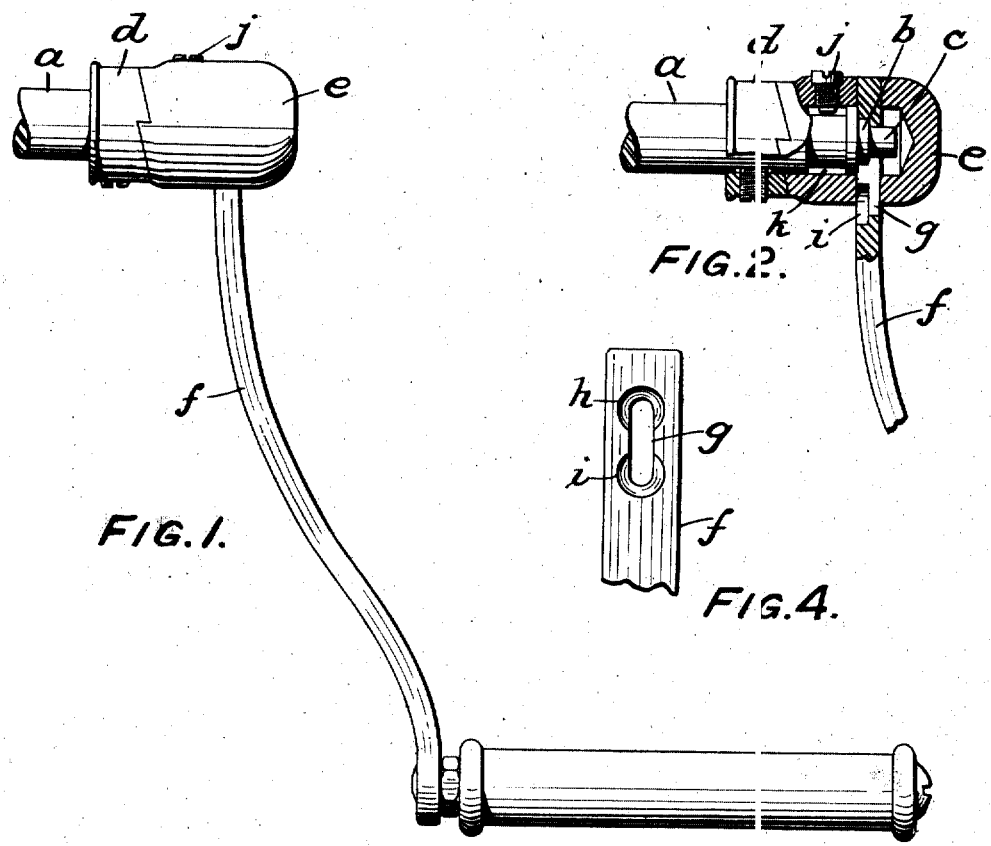

MAHLON C. TURNER, OF POUGHKEEPSIE, NEW YORK, ASSIGNOR TO THE DE LAVAL SEPARATOR COMPANY, A CORPORATION OF NEW JERSEY.

ADJUSTABLE CRANK.

1,215,747. Specification of Letters Patent. Patented Feb. 13, 1917.

Application filed February 25, 1914. Serial No. 820,860.

*To all whom it may concern:*

Be it known that I, MAHLON C. TURNER, a citizen of the United States, residing at Poughkeepsie, county of Dutchess, and State of New York, have invented a new and useful Improvement in Adjustable Cranks, of which the following is a full, clear, and exact description, reference being had to the accompanying drawings, which form a part of this specification.

In many machines operated by manual power, of which cream separators are one class, there is a large inertia making the start hard and yet after reaching full speed these machines run with little power.

If a long crank is used on such a machine the effort needed to start it is much less than with a short one, but after reaching full speed the exertion of moving the body to swing the large circle is more tiring than the work needed to drive the machine. The existence of these two opposed conditions has resulted in the use of a compromise length of crank that is too short for easy starting and yet is too long for easy operation after full speed has been attained.

The object of this invention is to provide a crank that may be adjusted to fit either of the above mentioned conditions. A second object is to provide a crank that may be changed from the length for one condition to the length for the other condition without stopping the machine. A third object is to provide automatic means for locking it at either position while it is being used. A fourth object is to provide automatic means to release the lock when the application of power to the crank ceases.

In the preferred embodiment of my invention I make use of a crank hub, loose on the driven shaft and having a hole through which a crank arm is adapted to slide. On the end of the shaft is a boss adapted to enter either one or the other of two sockets in the crank arm, one of which is at each of the desired centers of rotation of the arm. Projecting from the end of the above mentioned boss is a smaller boss adapted to enter a slot in the crank arm, said slot being of such a length that when the said small boss is at one or the other end of the slot the first mentioned boss is in line with one or the other of the two sockets at the centers of rotation. On the crank hub and on the shaft, or a collar attached thereto, are ratchet teeth adapted to engage if the crank moves forward, relative to the shaft, or release if it moves backward, and adapted in the release action to move the crank hub and arm longitudinally, relative to the shaft so as to cause the larger boss on the shaft end to be disengaged from the socket in the crank arm.

Referring to the drawings:

Figure 1 is a side view of a crank embodying my invention.

Fig. 2 is a view, partly in section, showing the crank engaged for a long stroke.

Fig. 3 is a similar view showing the crank in the process of changing from one adjustment to the other.

Fig. 4 is a view of one side of a portion of the crank arm.

Fig. 5 is a view similar to Fig. 2 showing an alternative construction.

$a$ is a crank shaft having the bosses $b$ and $c$ on the end. $d$ is a ratchet collar secured to the crank shaft. $e$ is a crank hub bored to fit the shaft $a$ and slotted for the crank arm $f$, which is shown of rectangular section but may be made of any desired shape. In the crank arm is a slot $g$ adapted to slide on the boss $c$. There are also two sockets $h$ and $i$ in the crank arm adapted, when the boss $c$ is at the end of the slot $g$, to fit over the boss $b$ on the crank shaft. In the hub $e$ is a screw $j$ the end of which enters a groove $k$ turned near the end of the crank shaft $a$ and prevents the hub coming off the shaft.

The operation of the device is as follows: The crank when released naturally hangs downward and when disengaged will drop into the position for a long stroke. A slight forward movement of the crank handle accompanied by an inward pressure will cause the crank and hub to move inward. The socket $h$ will move onto the boss $b$ and the ratchet teeth will engage and cause the shaft to be turned. As long as power is applied the parts will remain engaged in this manner. After the desired speed has been attained the operator ceases to apply power and stops with the crank in the highest position. Because of the ratchet teeth on the collar $d$ and the crank hub $e$ the forward movement of the shaft $a$ forces the hub $e$ and with it the crank arm $f$ outward and the socket $h$ is disengaged from the boss $b$. The weight of the crank will now cause it to drop till the end of the slot $g$ strikes the boss $c$ at which point the socket $i$ is in line with the boss $b$. A forward movement of the crank accompanied by an inward pressure will cause the socket $i$ to engage the boss $b$ and the ratchet teeth on the crank hub $e$ to engage those on the collar $d$ and the crank may be used at short stroke as long as desired. When through with the machine the operator simply releases his hold on the crank and it will stop at the lowest position. The forward movement of the shaft and collar will force the hub outward releasing the arm from the boss $b$ and allowing it to drop to the position for a long stroke ready for the next start.

The construction shown in Fig. 5 is the same as that hereinbefore described (and corresponding parts are similarly lettered) except that for the boss $c$ on the extremity of the shaft $a$ is substituted a screw or boss $c'$ projecting inward from the end wall of the hub $e$. The boss $c'$ performs the same function as boss $c$; that is, it affords a guide for the slot $g$ in the crank arm $f$ and limits the longitudinal movement of the crank arm in both directions.

Having now fully described my invention, what I claim and desire to protect by Letters Patent is:

1. An adjustable crank construction comprising a crank shaft, a crank arm, means for connecting the crank arm and shaft and permitting the crank arm to turn freely in one direction independently of the shaft and to move in the direction of its length relatively to the shaft to vary the distance between the shaft and the free end of the crank arm, and locking connections between the shaft and crank arm adapted to maintain the crank arm in fixed relation to the shaft in either of its longitudinal positions in the turning movement of the crank arm in the opposite direction.

2. An adjustable crank construction comprising a driven crank shaft, a driving crank arm, means for connecting the crank arm and shaft and permitting the crank arm to freely revolve in one direction independently of the shaft and to slide in the direction of its length relatively to the shaft to provide a relatively long or short effective length of crank arm, and means to maintain the crank arm when in either longitudinal position in fixed relation to the shaft in the turning movement of the crank arm in the opposite direction.

3. An adjustable crank construction comprising a crank shaft, a crank arm, means permitting the crank arm to move in the direction of its length relatively to the shaft to vary the distance between the axis of the shaft and the free end of the crank arm, and a plurality of locking connections between the crank arm and shaft corresponding to the several longitudinally adjustable positions of the crank arm and each adapted to be rendered inoperative when the crank arm is withheld from rotation with the shaft.

4. An adjustable crank construction comprising a crank shaft, a crank arm, means permitting the crank arm to move axially along the shaft and also slide in the direction of its own length relatively to the shaft when in one of its axial positions, and locking means to maintain the crank arm when in either longitudinal position in fixed relation to the shaft when in the other of its axial positions.

5. An adjustable crank construction comprising a crank shaft, a crank arm, and connections between the crank arm and shaft including, first, guiding members permitting movement of the crank arm both in the direction of its length and in the direction of the axis of the shaft and, second, locking means maintaining the crank arm when in either longitudinal position in fixed relation to the shaft when turned in one direction but adapted to yield to allow axial displacement of the crank arm when turned in the other direction.

6. An adjustable crank connection comprising a crank shaft; a crank arm movable along the axis of the shaft; and means between the crank arm and crank shaft including, first, a guiding member along which the crank arm is slidable in the direction of its length, second, a ratchet connection enabling the shaft when turned in one direction to drive the shaft and when held from turning with the shaft to be displaced thereby axially, and third, locking connections adapted to maintain the crank arm in fixed relation to the shaft, in either of its longitudinal positions, in the turning movement of the crank arm in the opposite direction.

7. An adjustable crank construction comprising a crank shaft, a hub movable axially along the shaft, a ratchet clutch connection between the hub and shaft, thereby enabling the hub when turned in one direction to drive the shaft and when held from turning with the shaft to be displaced thereby axially, a crank arm carried by the hub and slidable thereon in the direction of its own length, when the hub is so displaced, to extend or contract its effective length, and locking means to maintain the crank arm, when moved to bring the hub into clutching engagement with the shaft, in its extended or contracted relation.

8. A machinery drive comprising a crank shaft, a hub turnable and slidable on the shaft, a ratchet connection between hub and shaft whereby the hub when rotated in one direction will rotate the shaft and when rotated relatively in the other direction will slide thereon out of driving relation, means limiting the last named sliding movement of the shaft, a crank arm turnable with the hub, and having a longitudinally extending slot and a plurality of sockets, a boss arranged axially of the shaft and engaging said slot, and a boss on the shaft adapted for engagement with either of said sockets.

In testimony of which invention, I have hereunto set my hand, at Poughkeepsie, on this 21 day of February, 1914.

MAHLON C. TURNER.

Witnesses:
 CHARLES L. POWELL,
 SELDEN H. HALL.